United States Patent Office 3,185,337
Patented May 25, 1965

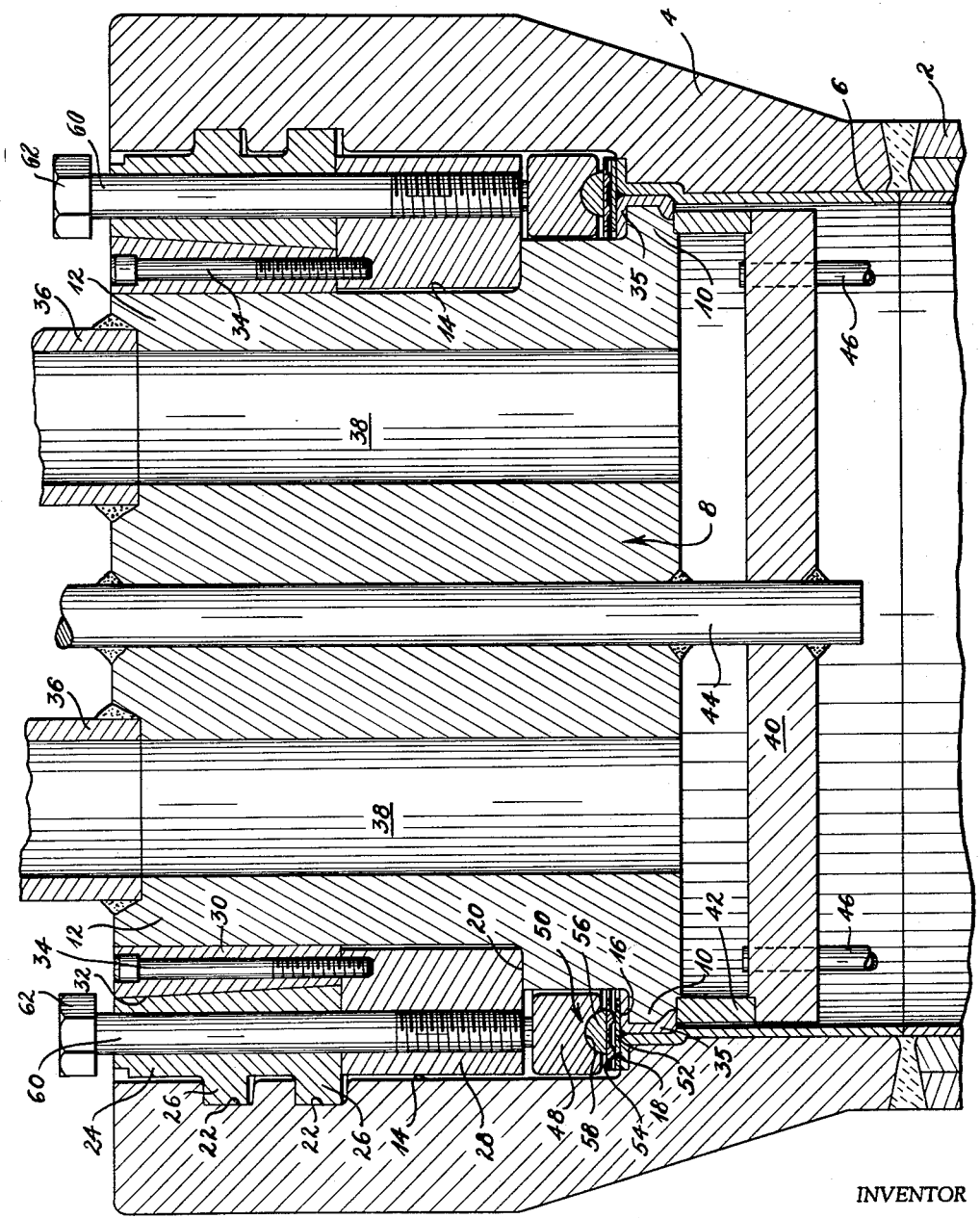

3,185,337
INTERNAL PRESSURE SEAL FOR PRESSURE VESSELS
Charles A. Long, 205 W. Elm St., Titusville, Pa.
Filed Aug. 29, 1963, Ser. No. 305,285
5 Claims. (Cl. 220—46)

This invention relates to pressure seals, particularly for use with vessels of large size containing gas or other fluids under very high pressure.

My prior Patent No. 2,545,290, dated March 13, 1951, shows and describes a self-equalizing pressure seal of the type employed in the present invention. In the structure shown in the prior patent, the entire pressure exerted against a closure for a vessel is applied through the seal. The arrangement disclosed therein is quite satisfactory for vessels of small and intermediate sizes but for larger vessels the total pressure on the closure becomes too great for the seal structure. The present invention relates to an arrangement embodying the seal of my prior patent and wherein the total pressure applied to the closure is reacted against means interlocking with the vessel's shell and separate means are employed to apply pressure to the sealing means. Further, the sealing means are arranged between the closure and the vessel shell at an interface close to the inner surface of the closure whereby to seal the vessel and to prevent contact of any corrosive content thereof with the larger portion of the closure and its retaining means.

It is, therefore, an object of this invention to provide a seal for high pressure vessels wherein the pressure within the vessel, as exerted on a closure, is reacted entirely against the vessel shell and wherein sealing means seal the closure to the shell independently of the closure locking means.

Another object of this invention is to provide a sealing arrangement as set forth wherein the sealing means isolate the closure holding means from contact with the contents of the vessel.

Still another object is to provide such a sealing arrangement which is relatively simple and economical to construct and yet highly efficient and reliable in operation.

Additional objects and advantages will become apparent to those skilled in the art as the description proceeds with reference to the accompanying drawing wherein:

The figure is a longitudinal sectional view through an open end of a pressure vessel embodying the present invention.

In the drawing, numeral 2 designates a laminated shell of a pressure vessel and numeral 4 indicates a generally cylindrical one-piece open end portion for the vessel. As shown, the open end piece 4 is welded to the laminated shell 2 and a suitable liner 6 is provided in the vessel to resist attacks by corrosive contents. It is contemplated that the shell portions 2 and 4 be of conventional steel whereas the liner 6 may be stainless steel or the like, depending upon the particular contents contemplated.

A closure member 8 is provided with an inner flange portion 10 substantially closing the open end of the vessel. The closure 8 is formed with an outer portion 12 of less diameter than the surrounding portion of the shell 4 to define an outwardly open channel 14 therebetween. The flange portion 10 of the closure 8 defines an outwardly facing surface 16 substantially coplanar with a corresponding outwardly facing surface 18 formed on the shell 4. The surfaces 16 and 18 define the bottom of the outwardly opening channel 14. A further portion of the closure 8 is formed to define an outwardly facing annular shoulder 20. The shell portion 4 is provided with a pair of circumferential grooves 22 opening into the channel 14 and a segmented ring 24 is provided with ribs 26 engaging in the grooves 22. The ring 24 comprises a multiplicity of arcuate segments separately movable into the position shown to thereby define a substantially continuous ring for a purpose to be described. A further ring 28 underlies the ring 24 in channel 14 and at its outer edge abuts the inner end of the segments 24 in pressure-transmitting relation. The axially inner end of the ring 28 abuts against the shoulder 20 on the closure 8 in pressure transmitting relation. A retaining ring 30 is located radially inwardly of the segments 24 and is a circumferentially continuous ring to thereby lock the segments 24 in their outer position, as shown. The outer edge of retaining ring 30 and the inner edge of the segments 24 are complementarily formed to define a frusto-conical interface 32 whereby axially inward movement of ring 30 forces the segments 24 radially outwardly. A plurality of cap screws 34 pass through the retaining ring 30 and are threadedly engaged with the further ring 28 whereby the retaining ring 30 may be forcibly drawn inwardly and the further ring 28 forcibly held against the inner end of segmented ring 24. As shown, the outer peripheral edge of the flange portion 10 and the surfaces 16 and 18 are also provided with a corrosion resistant layer 35 of material.

From the structure thus far described it will be apparent that the total force exerted by pressure in the vessel, across the closure 8, will be transmitted directly through shoulder 20, further ring 28, segmented ring 24 and ribs 26 directly to the shell 4 to lock the closure against outward movement. Obviously the extent of the areas of contact between the different elements described and the strength thereof may be designed to withstand any pressure capable of being retained in the vessel. While a pair of ribs 26 and corresponding groove 22 are shown, it is to be understood that a single rib and groove of appropriate dimensions could be used. The conduits 36, passageways 38, header 40, spacer ring 42, rod 44 and tubes 46 shown in the drawings constitute no part of the present invention. It is to be noted, however, that the spacer ring 42 and header 40 should be of corrosive resistant material, for example stainless steel, when the contents of the vessel are of a corrosive nature whereas the remainder of the closure structure and the entire locking ring assembly may be of other materials less expensive than stainless steel or the like. In this connection it is to be noted that the assembly comprising segments 24, retaining ring 30 and further ring 28 will be referred to hereinafter and in the appended claims as a locking ring assembly.

Within the channel 14 inwardly of the locking ring assembly but outwardly of the surfaces 16 and 18 is a pressure ring 48. Sealing means designated generally at 50 comprises a packing ring 52 extending across the surfaces 16 and 18 and spanning the clearance between flange portion 10 and shell 4. A bearing ring 54 is provided with a pair of concentric ribs bearing on the packing ring 52 opposite the respective surfaces 16 and 18. An equalizing ring 56 of semi-circular cross-sectional shape is arranged with its flat inner edge bearing against the outer surface of the bearing ring 54 and with its arcuate outer surface seated in a complementary annular groove 58 in the pressure ring 48.

A plurality of threaded members 60 extend loosely through the segments 24 and threadedly through the further ring 28 into bearing engagement with the outer surface of pressure ring 48. Each of the elements 60 is provided with a head 62 by which it may be rotated to exert axially inward pressure on the pressure ring 48 and thus firmly press the ribs on ring 54 inwardly to press packing ring 52 into sealing engagement with the surfaces 16 and 18, respectively, on opposite sides of the clearance between the closure and shell. Any leakage of pressure between the flange portion 10 and the shell 4 is prevented from further progress outward because sealing arrangement 50 and the screw members 60 may be manipulated to supply sufficient pressure to the sealing arrangement to maintain a complete and effective seal, irrespective of the total pressure in the vessel. The pressure in the vessel retained by the sealing means 50 is exposed to such a small area of the latter that extremely high pressures in the vessel will not be destructive to the seal. Furthermore, a total pressure exerted on the inner face of the closure 8 is transmitted directly therefrom to the locking ring assembly and to the shell 4 without being transmitted through the sealing means 50. It is to be further noted that the location of the sealing means 50 in the position shown and described eliminates the necessity of providing the outer periphery of the closure or any of the elements of the locking ring assembly with any corrosion-resistant properties and thus reduces the cost of the vessel.

While a single specific embodiment of the invention has been shown and described herein, the same is merely exemplary of the principle involved. Other embodiments are contemplated within the scope of the appended claims.

I claim:

1. In a pressure vessel: a generally cylindrical shell portion having an open end; a closure in said open end and having an inner flange portion substantially closing said open end and an outer portion of less diameter than said open end and defining an outwardly open channel therebetween; a locking ring assembly in said channel interlockingly engaged throughout substantially its entire periphery with said shell and held thereby against axial movement; said closure having an outwardly facing annularly continuous surface bearing directly on the inner end of an annularly continuous portion of said locking ring assembly to lock said closure in said open end; said shell portion and said flange portion having outwardly facing shoulders defining radially coplanar annular surfaces spaced axially inwardly of said locking ring assembly; annular sealing means sealingly engaging both said annular surfaces; a pressure ring outwardly of and bearing on said sealing means; and selectively operable pressure applying means for pressing said pressure ring and sealing means inwardly toward said annular surfaces to apply sealing pressure thereto; said pressure applying means extending outwardly through said locking ring assembly.

2. A pressure vessel as defined in claim 1 wherein said locking ring assembly comprises; a plurality of arcuate segments having at least one radial flange engaging in an inwardly facing groove in said shell; an annular retaining ring in said channel radially inwardly of and abutting said segments and locking the same against radially inward movement, a further ring abutting the axially inner ends of said segments and underlying said retainer ring, and threaded means releasably securing said retainer ring to said further ring; said outwardly facing surface on said closure bearing on the inner end of said further ring.

3. A pressure vessel as defined in claim 2 wherein the radially inner edges of said segments and the radially outer edge of said retaining ring define complementary frusto-conical surfaces flaring outwardly of said open end; said threaded means extending through said retainer ring and threadedly engaging said further ring.

4. A pressure vessel as defined in claim 1 wherein said pressure applying means comprises a plurality of members threaded through said locking ring assembly and bearing, at their inner ends, on said pressure ring.

5. A pressure vessel as defined in claim 1 wherein said sealing means comprises a flat packing ring spanning the joint between said coplanar surfaces; a bearing ring having concentric ribs bearing on said packing ring opposite said coplanar surfaces; respectively; and an equalizing ring of semi-circular cross-sectional shape arranged with its flat edge bearing on said bearing ring, spanning the space between said concentric ribs and with its arcuate surface seating in a complementary annular groove in said pressure ring.

References Cited by the Examiner

UNITED STATES PATENTS

| 2,226,495 | 12/40 | Jacocks | 220—3 |
| 2,545,290 | 3/51 | Long | 220—39 |

FOREIGN PATENTS

| 542,939 | 7/57 | Canada. |
| 542,940 | 7/57 | Canada. |
| 903,569 | 10/45 | France. |

THERON E. CONDON, *Primary Examiner*.